United States Patent [19]
Mix et al.

[11] Patent Number: 5,406,173
[45] Date of Patent: Apr. 11, 1995

[54] APPARATUS AND METHOD FOR ADJUSTING LIGHTS ACCORDING TO THE LEVEL OF AMBIENT LIGHT

[75] Inventors: Jerome M. Mix, Redwood City; Charles C. Hu, Saratoga; James C. Sprout, Los Altos; Kenneth A. McCuen, San Jose, all of Calif.

[73] Assignee: The Watt Stopper, Santa Clara, Calif.

[21] Appl. No.: 165,217

[22] Filed: Dec. 10, 1993

[51] Int. Cl.$^6$ ............................................. H05B 37/02
[52] U.S. Cl. ........................................ 315/156; 315/158; 315/159; 315/307; 315/DIG. 7
[58] Field of Search .............. 315/156, 159, 158, 151, 315/DIG. 4, DIG. 7, 149, 307

[56] References Cited

U.S. PATENT DOCUMENTS

| | | | |
|---|---|---|---|
| 3,459,961 | 8/1969 | Ravas | 307/116 |
| 3,500,455 | 3/1970 | Ross et al. | 315/149 |
| 3,573,543 | 4/1971 | Grindstaff | 315/194 |
| 3,864,566 | 2/1975 | Simpson et al. | 250/216 |
| 3,898,383 | 8/1975 | Herbits | 315/291 X |
| 4,021,679 | 5/1977 | Bolle et al. | 307/117 |
| 4,450,351 | 5/1984 | Fraden | 250/221 |
| 4,461,977 | 7/1984 | Pierpoint et al. | 315/159 |
| 4,540,984 | 9/1985 | Waldman | 340/825 |
| 4,568,868 | 2/1986 | Schlepp et al. | 320/5 |
| 4,636,774 | 1/1987 | Galvin et al. | 340/565 |
| 4,650,986 | 3/1987 | Maile | 250/214 SW |
| 4,697,122 | 9/1987 | Hoffer | 315/158 |
| 4,727,593 | 2/1988 | Goldstein | 455/605 |
| 4,758,767 | 7/1988 | Blake | 315/158 |
| 4,818,973 | 4/1989 | Yamakawa et al. | 340/572 |
| 5,099,193 | 3/1992 | Moseley et al. | 315/291 X |
| 5,189,393 | 2/1993 | Hu | 340/522 |
| 5,220,250 | 6/1993 | Szuba | 315/156 X |
| 5,293,097 | 3/9194 | Elwell | 315/159 X |

FOREIGN PATENT DOCUMENTS 2183377  6/1987  United Kingdom ............... 359/147

OTHER PUBLICATIONS

Philips Lighting Sep. 1990 p. 2.
"Lite-Miser" Brochure.

Primary Examiner—Robert J. Pascal
Assistant Examiner—Haissa Philogene
Attorney, Agent, or Firm—Townsend and Townsend Khourie and Crew

[57] ABSTRACT

A device for controlling the level of light in an area or room. The device includes a sensor that detects whether the room is occupied, a light meter that detects the level of ambient light entering the room, and circuitry that controls the lights in the room in response to the sensor and light meter. The controlling circuitry increases the light level in the room when the room is occupied and the light meter senses that the ambient light level is not above a particular level. When the room is unoccupied for a brief period of time, the device increases or decreases the light level of the room by controlling lights accordingly, in response to the level of light sensed by the light meter. And finally, when the room is unoccupied for an extended period of time, the device turns power off to all the lights in the room.

25 Claims, 5 Drawing Sheets

APPARATUS AND METHOD FOR ADJUSTING LIGHTS ACCORDING TO THE LEVEL OF AMBIENT LIGHT

BACKGROUND OF THE INVENTION

The present invention pertains to a device that controls power to an electric load. More specifically, the present invention relates to a sensor for detecting whether an area or room is occupied and detecting the level of ambient light in an area or room and activating lights or other apparatus accordingly.

There are a variety of sensors on the market that detect whether an area or room is occupied and automatically turn lights ON and OFF accordingly. These sensors commonly detect either movement in the room or body heat present in the room.

Movement is commonly detected by using an ultrasonic transmitter and receiver that are mounted in a room at a position where movement is most likely to be detected. The ultrasonic transmitter transmits an ultrasonic signal that reflects off objects in the room and is detected by the ultrasonic receiver. The frequency of the received waves can be used to detect movement by the Doppler effect. Body heat is typically detected by an infrared sensor that detects heat given off by a person in the room, or detects movement or changes in a heat source.

Despite the fact that these sensors are typically designed with an eye to energy efficiency, prior to the present invention, none of the available occupancy detector sensors were able to adjust the brightness of lights in a room according to the level of ambient light in the room. Thus, if it was a bright sunny day, the prior art occupancy detection sensors needlessly allowed energy to be consumed by turning lights ON to full intensity levels when lower wattage levels would have sufficiently lit a room.

Sensors that detect the level of ambient light in a room and either turn lights ON or OFF or adjust the intensity level of lights accordingly, to reduce the amount of energy consumed by the lights, are also available on the market. Although the primary purpose of these ambient light detector sensors is to ensure less energy is consumed, all of the currently available sensors adjust the brightness of lights in a room regardless of whether the room is occupied. Thus, the level of energy saved by using these sensors is not optimized, and energy costs are higher than necessary.

SUMMARY OF THE INVENTION

The present invention solves the problems associated with prior art sensors by providing a sensor that detects whether a room is occupied and detects the level of ambient light in a room. The present invention then adjusts the lighting of a room accordingly to maximize energy savings.

The present invention includes a sensor that detects whether the room is occupied, a light meter that detects the level of ambient light entering the room, and circuitry that controls the lights in the room in response to the sensor and light meter. The controlling circuitry increases the light level in the room when the room is occupied, and the light meter senses that the ambient light level is not above a particular level. When the room is unoccupied for a brief period of time, the device increases or decreases the light level of the room by adjusting lights in response to the level of light sensed by the light meter. This both allows (1) the light level to be decreased when people are gone from the room for a short time and (2) any decreases of the ambient light level to be done during short absences rather than when people are in the room. And finally, when the room is unoccupied for an extended period of time, the device turns power OFF to all the lights in the room.

One embodiment of the present invention increases and decreases the light level in a room by independently switching individual lights in the room ON and OFF. Lights are switched OFF depending on how far they are from a window or other ambient light source.

Another embodiment decreases the light level by dimming the lights in the room.

The features and advantages of a sensor according to the present invention will be more clearly understood from the following description taken in conjunction with the accompanying drawings.

DESCRIPTION OF THE PREFERRED EMBODIMENTS

Figure 1:
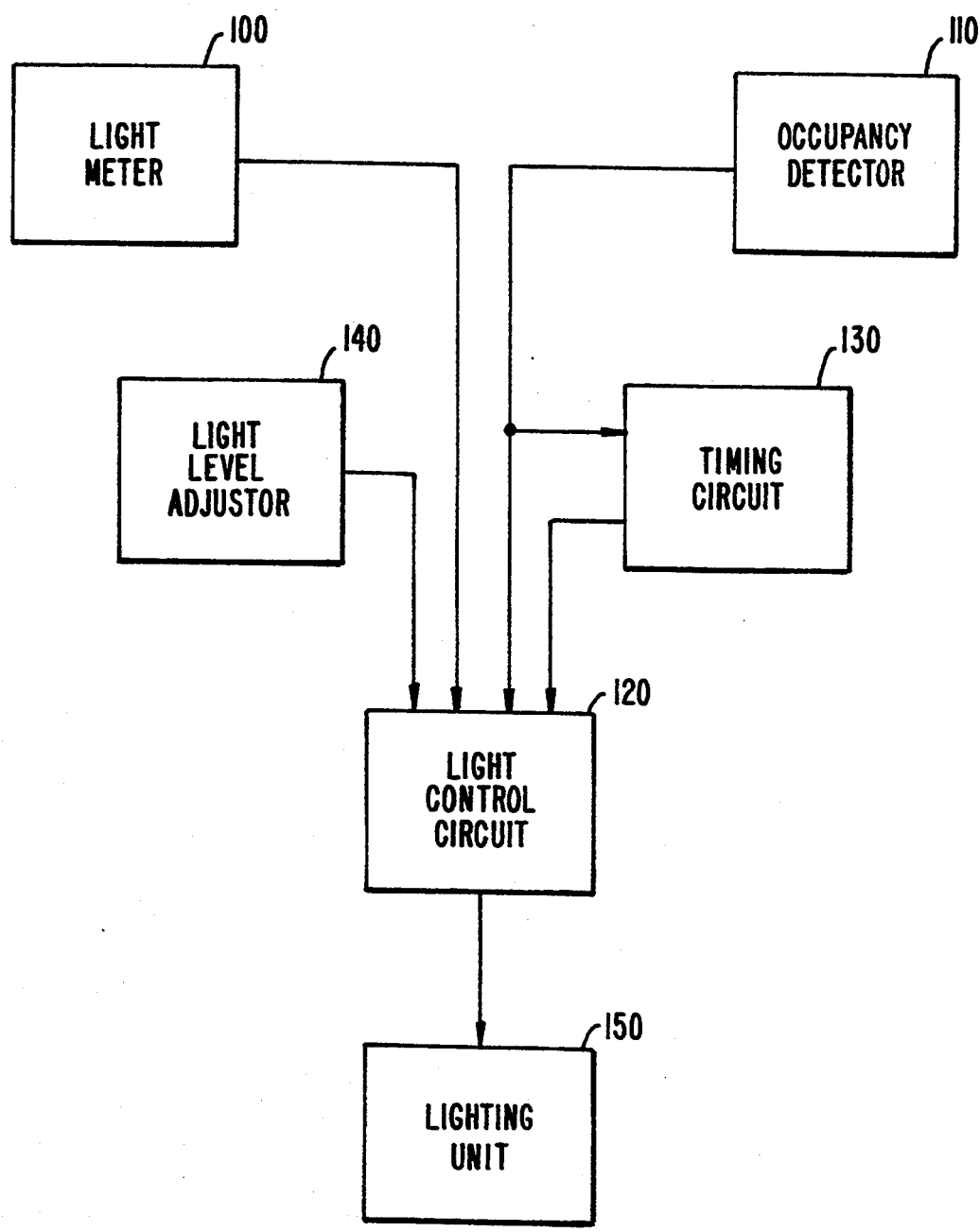
FIG. 1 is a block diagram of one embodiment of the sensor according to the present invention.

FIG. 1 is a block diagram of one embodiment of the sensing device of the present invention. The sensing device shown in FIG. 1 includes a light meter 100 for detecting the level of ambient light at a location, an occupancy detector 110 for detecting whether an area is occupied, a light control circuit 120 for controlling lights in the area, a timing circuit 130 for timing periods when the area is unoccupied, and a light level adjustor 140 for setting a desired light level at which a lighting unit 150 is adjusted.

Light meter 100 is a photosensor that senses the level of ambient light at the location where the present invention is installed and generates an analog signal indicative of the sensed light level. Light meter 100 is coupled at an output to an input of light control circuit 120. Of course, one of skill in the art will recognize many devices similar to a photosensor that can be used to implement light meter 100.

Occupancy detector 110 can be any of a variety of devices that detects the presence of a person in a room. For example, occupancy detector 110 can include an infrared detector that senses the body heat of an occupant in a room or an ultrasonic motion detector that detects movement in a room. The circuitry associated with detecting the presence and absence of a person in an area is well known to those skilled in the art. One example that details how to implement both an ultrasonic detector and an infrared detector is U.S. Pat. No. 5,189,393 entitled "Dual Technology Motion Sensor," assigned to Applicants and incorporated by reference into this application for patent. In fact, it is possible for occupancy detector 110 to be a dual technology detector as exactly as described in U.S. Pat. No. 5,189,393.

Persons skilled in the art will recognize a variety of sensors besides infrared and ultrasonic that can be used to implement occupancy detector 110.

Occupancy detector 110 is coupled at an output to a second input of light control circuit 120 and to an input of timing circuit 130. Timing circuit 130 is also coupled at an output to light control circuit 120. Occupancy detector 110 outputs a signal whenever it detects the presence of a person in the room or area where the sensor is placed, and timing circuit 130 tracks the periods in which no signal is received from occupancy detector 110. In the preferred embodiment, timing circuit 130 tracks two time periods and generates first and second time-out signals accordingly. The first time-out signal is generated when a first timer of timing circuit 130 detects that the room has been unoccupied for an extended time period. The second time-out signal is generated when a second timer of timing circuit 130 detects that the room has been unoccupied for a brief period. For instance, if the sensor device is placed in a school classroom, the second timer can generate a time-out signal shortly after everyone in the classroom leaves for recess, but since recess is a fairly short break, the classroom will be occupied before the first timer times-out (with the lights only being dimmed). At the end of the school day, however, the classroom will be empty for a substantial period of time, and the timing circuit 130 will generate the first time-out signal (turning the lights completely OFF). Of course, the present invention is not intended to be limited to a timing circuit with two separate timers. Timing circuit 130 can easily track one time period or three or more time periods.

Light control circuit 120 receives the signals output from light meter 100, occupancy detector 110, and timing circuit 130. In the preferred embodiment, where the first and second time-out signals are generated by timing circuit 130, light control circuit 120 controls lighting unit 150 in response to the two time-out signals and the level of ambient light detected by light meter 110.

Light level adjustor 140 can be used to adjust the level to which light control circuit 120 sets lighting unit 150. Light level adjustor 140 is implemented with a simple potentiometer in one embodiment and a more advanced keypad input device in another embodiment. A person skilled in the art will easily recognize other equivalent ways to implement light level adjustor 140.

I. Operation of the Present Invention

Since the first time-out signal is only generated after the second time-out signal has been generated, there are three possible states represented by the signals received from timing circuit 130: (1) neither the first nor second time-out periods have expired signifying the room is either still occupied or has been unoccupied for only a very brief amount of time; (2) the second time-out period expired and the second time-out signal has been generated signifying the room has been unoccupied for a relatively short time period; and (3) the first time-out period has expired, and thus both the first and second time-out signals have been generated signifying the room has been unoccupied for a substantial period of time.

1. Neither time-out period has expired

When the room in which the present sensor is installed is occupied, neither the first nor second timers have timed-out. When the ambient light signal received from light meter 100 indicates the level of detected light is below the level chosen by a user through light level adjustor 140, light control circuit 120 increases the light level.

When the detected light level from light meter 100 increases beyond the level chosen by a user, light control circuit 120 initiates a signal to decrease the light level in the room. However, because the retina of the human eye is slow to adjust to light changes, in the preferred embodiment of the present invention, light control circuit 120 does not initiate a signal to decrease the brightness of lighting unit 150 in this situation regardless of how much the detected ambient light level increases. Decreasing the lighting in the room in this instance may be more of an annoyance to people in the room than an energy saver. Other embodiments, however, freely increase and decrease the brightness output by lighting unit 150 in response to increases or decreases of ambient light detected by light meter 100. Additionally, in another embodiment, only changes above a specified de minimis level are effected by light control circuit 120.

2. Timing count 130 has generated the second time-out signal but not the first time-out signal When the room becomes unoccupied for a brief period of time, the second timer of timing circuit 130 times-out and timing circuit 130 generates the second time-out signal. Since the room is unoccupied, decreasing the light level in the room cannot be an annoyance and light control circuit 120 freely adjusts the brightness created by lighting unit 150 up and down to compensate for increases or decreases in the measured ambient light level.

The second timer remains timed-out until occupancy detector 110 detects the presence of a person at which time the second timer is reset and remains so until no occupancy is detected at which time it starts its count all over.

3. Timing circuit 130 has generated both the first and second time-out signals When timing circuit 130 generates the first time-out signal (the second time-out signal has already been generated by definition), the room or area has been unoccupied for a substantial time period. Light control unit 120 turns lighting unit 150 OFF to save energy costs. Lighting unit 150 will remain OFF until occupancy detector 110 detects the presence of a person in the room again sending a signal to light control circuit 120 which switches lighting unit 150 ON at the light level determined by light level adjustor 140 in response to light meter 100 and resets both time-out periods of timing circuit 130.

II. A First Embodiment: Adjusting Lighting by Switching Individual Lights Off

Figure 2:
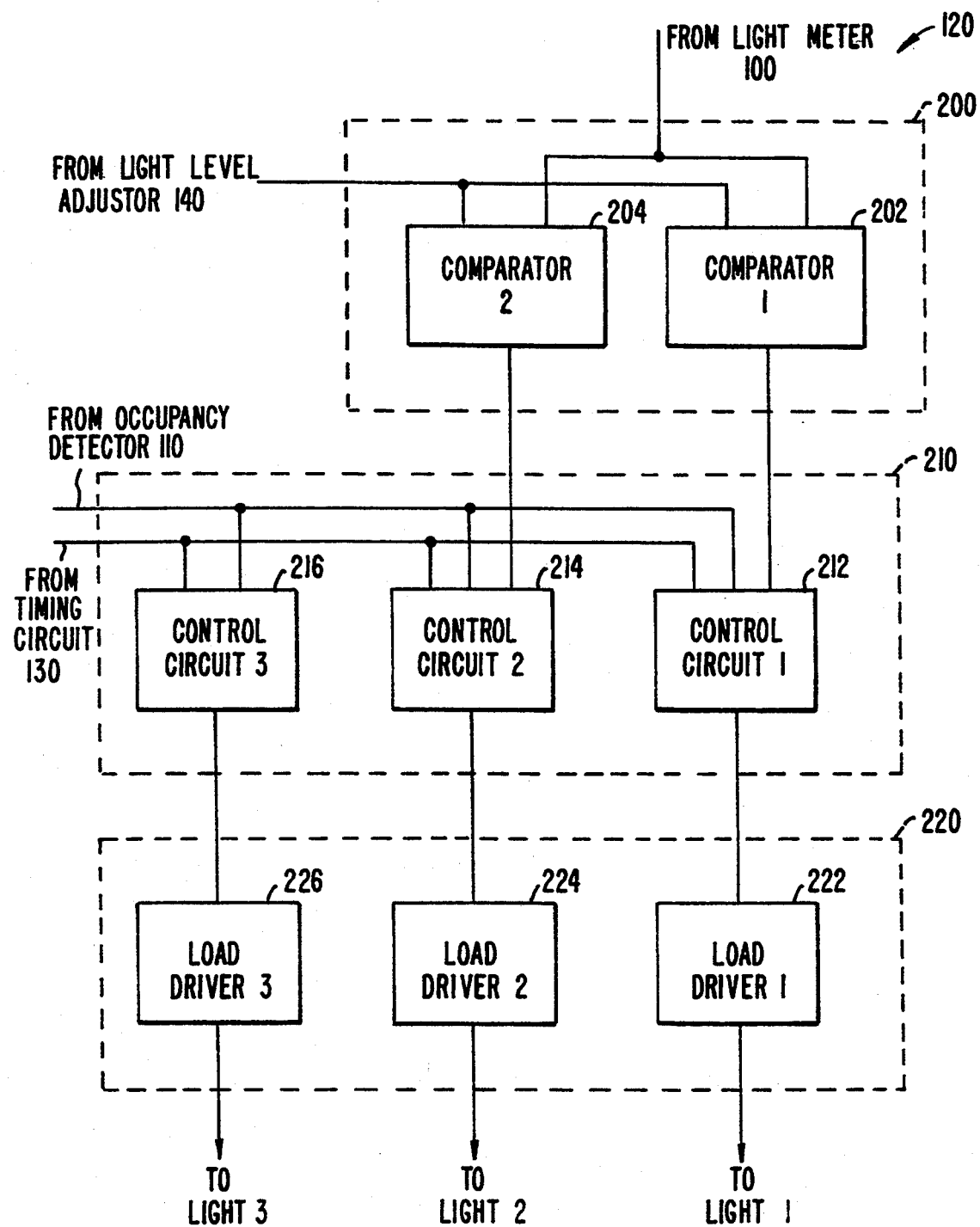
FIG. 2 is a block diagram of an embodiment of the light control unit shown in FIG. 1 according to one species of the present invention.

FIG. 2 is a block diagram of an embodiment of light control circuit 120 shown in FIG. 1 according to one species of the present invention. The species shown in FIG. 2 uses a plurality of lights to implement lighting unit 150 of FIG. 1. To adjust the brightness of light emitted from lighting unit 150, the species of FIG. 2 switches individual lights ON and OFF as necessary.

In FIG. 2, light control circuit 120 comprises a comparator circuit 200 for comparing the light level sensed by light meter 100 with predetermined light levels, a control circuit 210 for determining whether individual lights in lighting unit 150 should be switched ON or OFF, and a load driver 220 for switching power to individual lights in lighting unit 150.

Comparator circuit 200 comprises individual comparator circuits 202 and 204. Each comparator circuit 202 and 204 is coupled at a first input to light meter 100 and at a second input to light adjustor 140. Each comparator circuit 202 and 204 compares the light level measured by light meter 100 to a predetermined light level. Typically, the level to which each comparator compares the measured light level is different. That is, comparator circuit 202 compares the measured light level to a first level, while comparator 204 compares the measured light level to a second level, higher (thus brighter) than the first. Each comparator circuit 202 and 204 outputs a signal indicative of the comparison. The predetermined light level of each comparator may be adjusted by light level adjustor 140.

Control circuit 210 comprises individual control circuits 212, 214 and 216. Each control circuit 212, 214, and 216 is coupled at a first input to occupancy detector 110 and at a second input to timing circuit 130. Control circuits 212 and 214 are also directly coupled to comparator circuits 202 and 204, respectively. Each control circuit 212, 214, and 216 controls whether a corresponding load driver 222, 224, and 226, from load driver circuit 220, drives power to the individual light (or set of lights) to which the load driver is coupled.

It should be obvious to one skilled in the art that comparator 200, control circuit 210, and load driver 220 can be made up of a virtually unlimited number of individual comparators, control circuits, and load drivers, respectfully. Thus, this first embodiment can be designed to control N individual lights in a lighting unit 150 containing N lights. A light control circuit 120 designed to control N individual lights would comprise N load drivers, N control circuits, and N-M comparators if M lights were switched ON and OFF in response to whether a room is occupied independent of the detected light level.

The operation of the first embodiment of light control circuit 120 is illustrated in the following example of a typical day at a school. The example concentrates on a room having three banks of fluorescent lights operating as lighting unit 150 and controlled by the first embodiment of the sensor of the present invention. The first bank of lights is closest to windows in the room, the second bank is in the middle of the room, and the third bank is farthest from the window.

When a teacher or student first enters the room, occupancy detector 110 detects their presence and sends a signal to control circuit 210. Individual control circuit 216 automatically activates load driver 226 which switches the third bank of lights in the room ON. Light meter 100 measures the level of ambient light present in the room, which is typically fairly low first thing in the morning. Comparator circuits 202 and 204 compare the measured level versus two predetermined levels. Since it is early morning, the measured light level is below both predetermined levels and comparators 202 and 204 output signals indicating such to control circuits 212 and 214, respectively. Control circuits 212 and 214 activate load drivers 222 and 224, respectively, which switch the first and second banks of lights ON.

Throughout the morning, the level of ambient light measured by light meter 100 increases; however, as long as the room is occupied, light control circuit 120 does not turn any of the banks of lights OFF. During lunch time, when there is still a very high level of ambient light in the room, the room empties out. Timing circuit 130 detects that the room is not occupied and after a brief period generates the second time-out signal. Control circuits 212 and 214 detect that light banks one and two are no longer needed to effectively light the room, so control circuits 212 and 214 deactivate load drivers 222 and 224 to turn the first and second banks of lights OFF.

Students return from lunch before timing circuit 130 generates the first time-out signal. After school lets out for the afternoon, the teacher works in the room grading papers. When the sun starts to set, the level of light detected by light meter 100 drops below the predetermined level of comparator 204 but stays above the predetermined level of comparator 202. Control circuit 214 then activates load driver 224 which switches the second bank of lights ON.

The teacher leaves shortly thereafter, and timing circuit 130 generates the first time-out signal after the room has been unoccupied for a substantial period of time. When the first time-out signal is generated, each individual control circuit 212, 214, and 216 deactivates its respective load driver and all the lights in the room are switched OFF.

In this embodiment, as long as the room is occupied, the third bank of lights is always switched ON because it is controlled by control circuit 216 which is not coupled to a corresponding comparator circuit (since the third bank is farthest from the window, the ambient light level would be lowest near the third light). However, it would be obvious to one skilled in the art to modify light control circuit 120 such that every individual light in lighting unit 150 is controlled by a control circuit coupled to a comparator. That is, each light can be individually switched OFF if the ambient light level is bright enough.

Figure 3A:
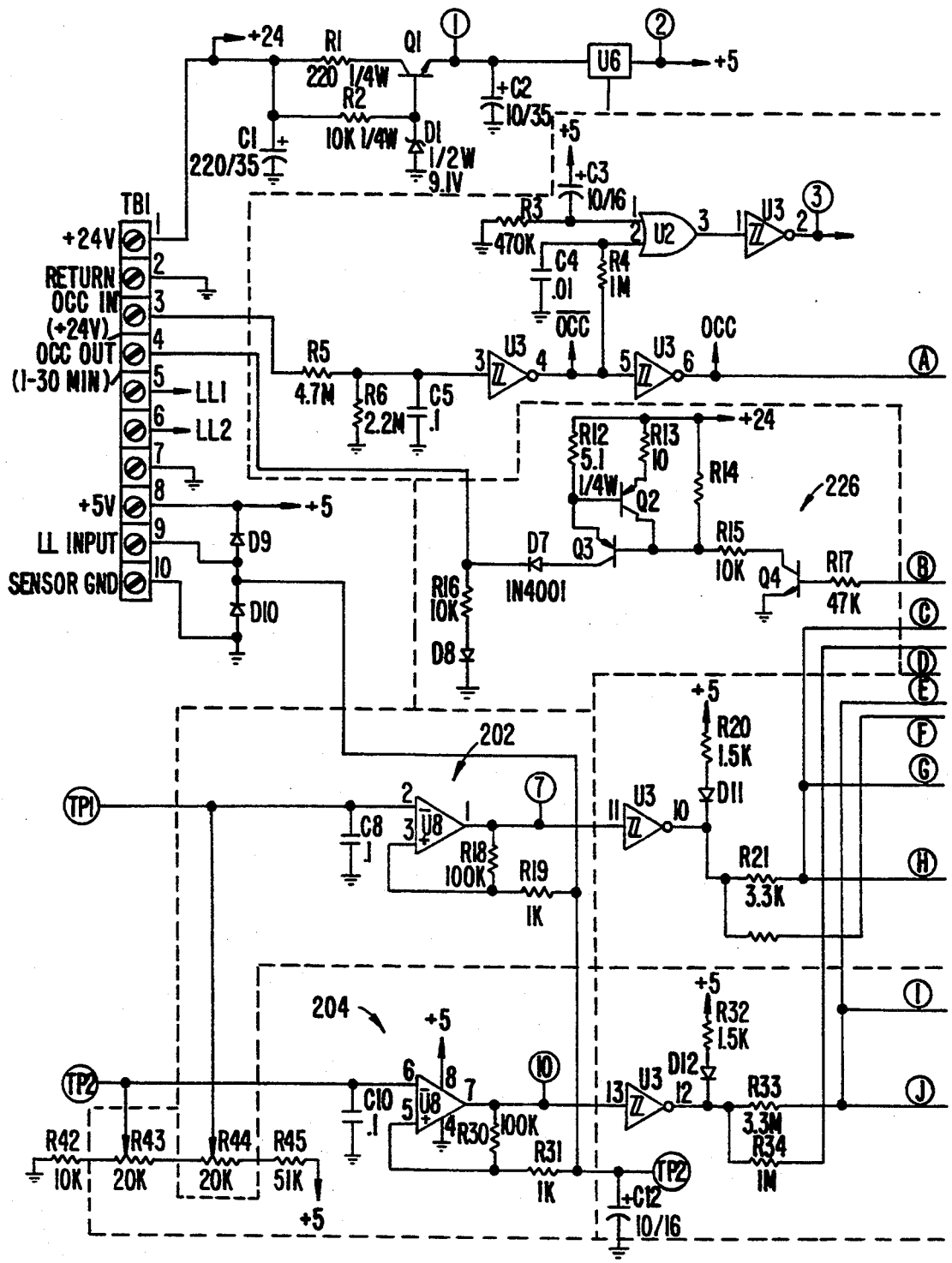
FIG. 3(A and B) is a schematic diagram of an embodiment of a portion of the light control unit shown in FIG. 2.
Figure 3B:
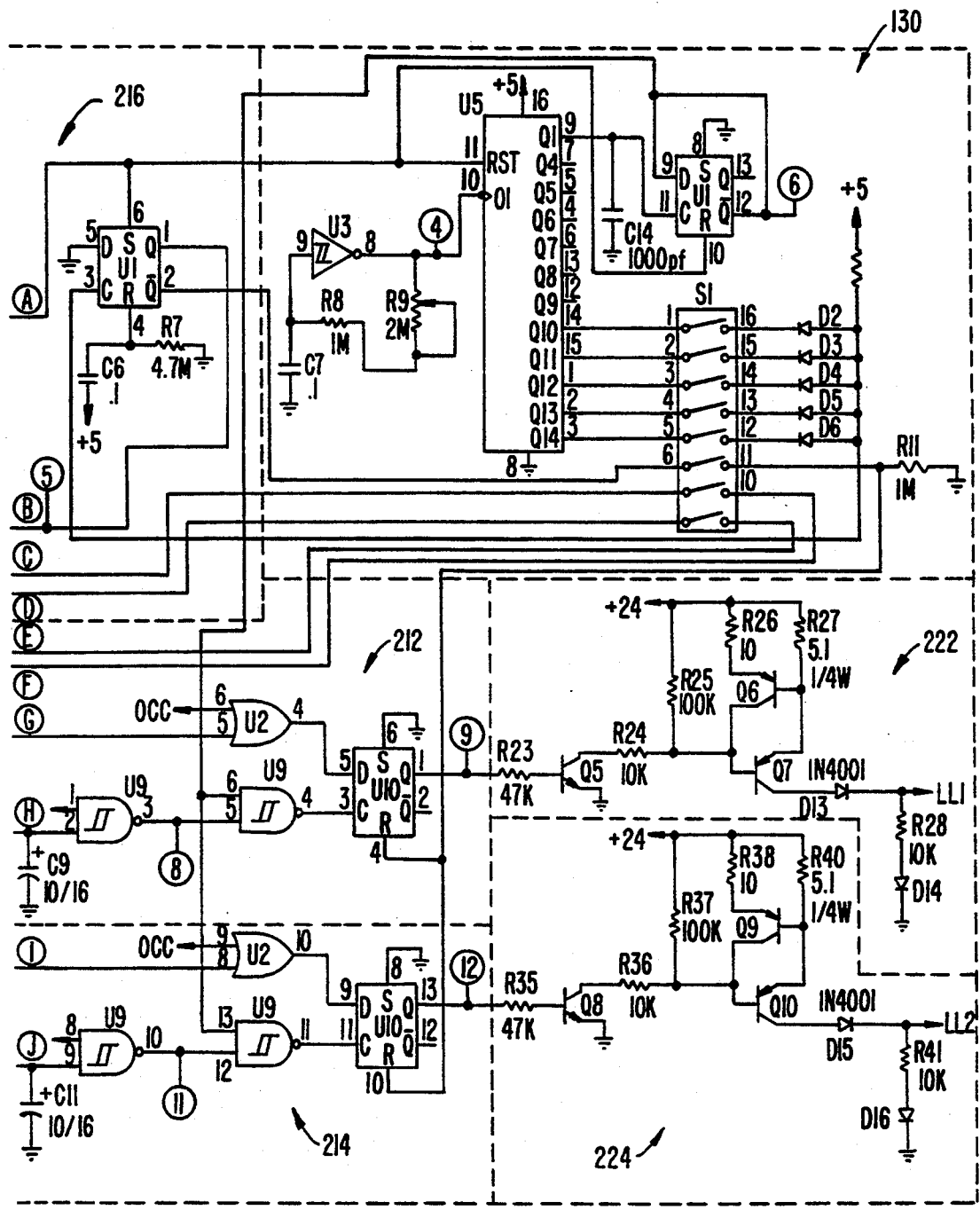

FIG. 3 is a schematic diagram of an embodiment of the circuits of light control unit 120 and timing circuit 130 shown in FIG. 2. The light control unit shown in FIG. 3 is capable of independently driving power to three individual lights (or to three banks or sets of lights). Accordingly, the light control unit shown in FIG. 3 has two comparator circuits 202 and 204, three control circuits 212, 214, and 216, and three load drivers 222, 224, and 226.

A first light of lighting unit 150, which is always the first light switched OFF when the light level of lighting unit 150 can be decreased and is the last light to be switched ON, is coupled to pin 5. A second light of lighting unit 150, which is the second light switched OFF when the light level of lighting unit 150 can be decreased and is the first light to be switched ON when additional lighting is needed, is coupled to pin 6. Finally a third light, which is always ON unless timing circuit 130 has generated the first time-out signal, is coupled to pin 4.

III. A Second Embodiment: Adjusting Lighting by Dimming Lights

Figure 4:
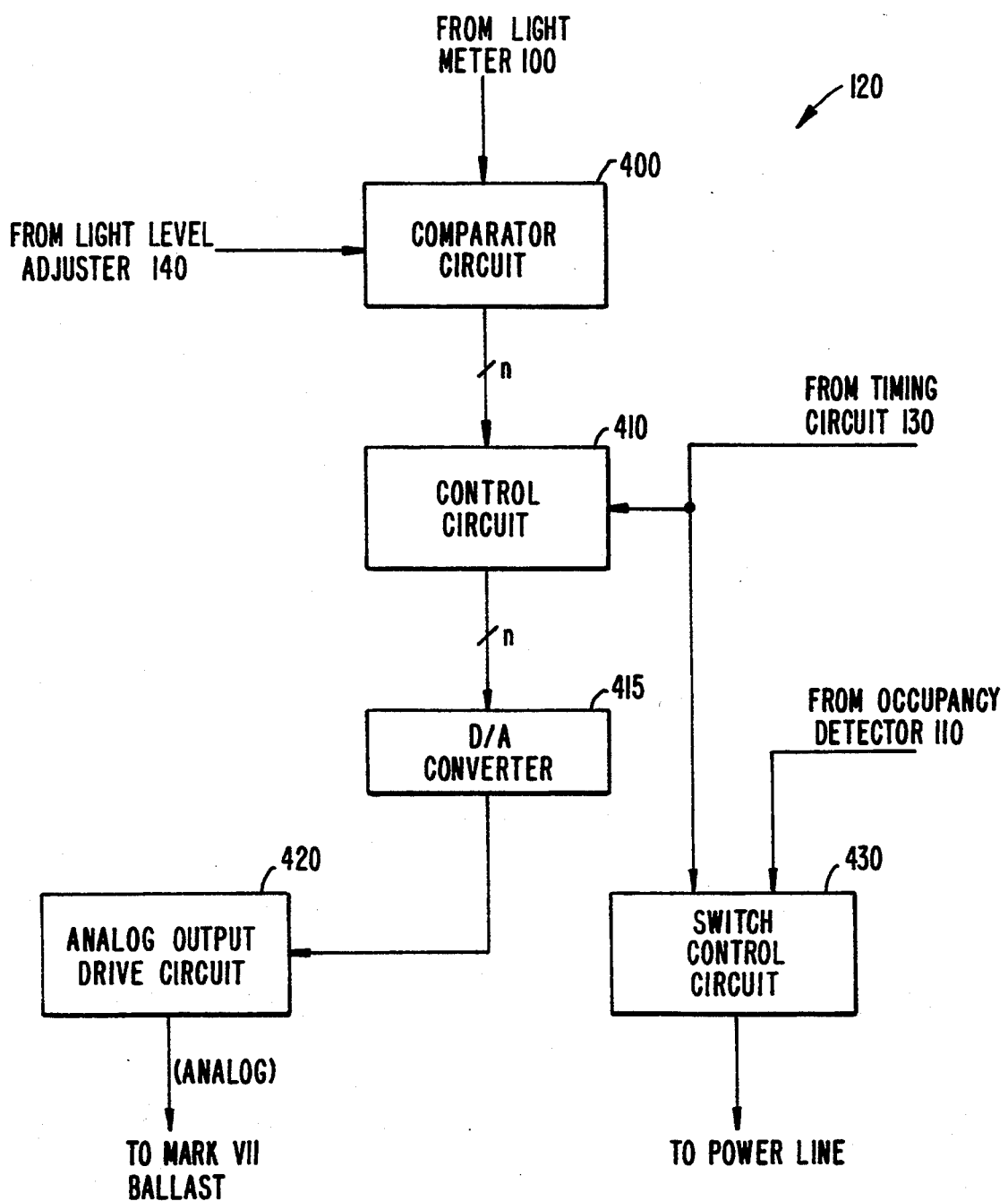
FIG. 4 is a block diagram of a second embodiment of the light control unit shown in FIG. 1 according to a second species of the present invention.

FIG. 4 is a block diagram of a second embodiment of the light control unit shown in FIG. 2 according to a second species of the present invention. The species shown in FIG. 4 can use either a single light or many lights to implement lighting unit 150 of FIG. 1, but all lights are plugged into a dimmable ballast such as the Mark VII Fluorescent Lamp Ballast manufactured by Advance Transformer Company.

The Mark VII ballast accepts a DC input voltage of between 2 and 10 volts to adjust the brightness of a fluorescent lamp. When the input voltage is 2 volts, the ballast operates the lamp at 20% of its maximum output. When the input voltage is 10 volts, the ballast operates at the 100% level. It should be obvious to one skilled in the art that the disclosed embodiment of the second species of the present invention can also be employed to drive lights connected to any ballast similar to the Mark VII.

In FIG. 4, light control circuit 120 comprises a comparator circuit 400, a control circuit 410, a digital-to-analog converter 415, an analog output drive circuit 420, and a switch control circuit 430.

Comparator circuit 400 is coupled at a first input to light meter 100 and at a second input to light level adjustor 140. Comparator circuit 400 compares the light level detected by light meter 100 to predetermined light levels set in comparator circuit 400 and adjusted by light level adjustor 140 and outputs signals indicative of the comparisons. Comparator circuit 400 can be implemented in a well known manner using a two comparator approach that outputs up and down digital signals to control circuit 410. Those of skill in the art will recognize that there are many other ways to implement comparator circuit 400 besides the two comparator up/down approach. For example, comparator circuit 400 could be a plurality of individual comparator circuits connected in parallel or the comparator inputs of a microcontroller chip.

The number of light levels to which comparator circuit 400 compares the output of light meter 100 determines the number of different intensity levels at which lighting unit 150 can be set. Comparing the measured ambient light level to N different levels allows lighting unit 150 to be set to N+1 different intensity levels. That is, if comparator circuit 400 compares the output of light meter 100 to four different levels of increasing intensity, lighting unit 150 can be set to one of five different intensity levels.

Control circuit 410 receives the count up and count down digital signals output from comparator 400 and the second time-out signal generated by timing circuit 130. Control circuit 410 outputs a digital signal (the count) that represents the level to which lighting unit 150 is adjusted. The outputted digital signal is converted to analog form by digital-to-analog converter 415 and then sent to analog output drive circuit 420 which outputs an analog signal that sets the light level of lighting unit 150.

When comparator circuit 400 detects that the level of light in the room should be increased, the signal output from control circuit 410 tells analog output drive circuit 420 to increase the analog output voltage driving the dimmable ballast of lighting unit 150. When comparator circuit 400 indicates the level of light in the room should be decreased and timing circuit 130 has generated the second time-out signal indicating the room is unoccupied, control circuit 410 outputs a signal to analog output drive circuit 420 to decrease the output voltage driving the dimmable ballast of lighting unit 150.

Analog output drive circuit 420 receives an input from control circuit 410 through analog-to-digital converter 415 and outputs an appropriate voltage level to control the intensity of lighting unit 150.

Switch control circuit 430 receives inputs from occupancy detector 110 and timing circuit 130 to switch lighting unit 150 ON and OFF. When timing circuit 130 generates the first time-out signal, switch control circuit 430 switches lighting unit 150 OFF. When lighting unit 150 is switched OFF and occupancy detector 110 detects the presence of a person in the room, switch control circuit 430 switches lighting unit 150 ON to the intensity level set by control circuit 410.

Having fully described two embodiments of the present invention, many other equivalent or alternative methods of implementing the present sensor will be apparent to those skilled in the art. For example, specific lights in a single fixture may be individually controlled in another embodiment of the present invention. Additionally, a microcontroller could be used to implement the timing and other controls in a number of different ways. These equivalents and alternatives are intended to be included within the scope of the present invention.

What is claimed is:

1. An apparatus for controlling a light source, said apparatus comprising:
    (a) detecting means for detecting whether an area is occupied;
    (b) light sensing means for measuring a level of ambient light;
    (c) timing means, coupled to said detecting means, for generating a first time-out signal when the area is unoccupied for a first time period; and
    (d) light control means, coupled to said detecting means and to said light sensing means, for controlling said light source in response to said detecting means, said first time-out signal, and said light sensing means;
    wherein
        said light control means turns said light source ON when said detecting means detects the area is occupied;
        said light control means adjusts said light source brighter when the light level measured by said light sensing means is below a predetermined level; and
        said light control means turns said light source OFF when said timing means generates said first time-out signal.

2. The apparatus of claim 1 further comprising a light level adjustor for adjusting said predetermined level.

3. An apparatus for controlling a light source, said apparatus comprising:
    (a) detecting means for detecting whether an area is occupied;
    (b) light sensing means for measuring a level of ambient light;
    (c) timing means, coupled to said detecting means, for generating a first time-out signal when the area is unoccupied for a first time period; and
    (d) light control means, coupled to said detecting means and to said light sensing means, for controlling said light source in response to said detecting means, said first time-out signal, and said light sensing means;
        wherein said light source comprises a plurality of lights and wherein said light control means is separately coupled to each of said plurality of lights and switches individual lights in said plurality of lights ON and OFF in response to said timing means, said light sensing means, and said detecting means.

4. The apparatus of claim 3 wherein said light control means comprises:
    (a) load driving means, coupled to said plurality of lights, for driving power to each of said individual lights in response to a corresponding power control signal; and (b) brightness control means, coupled to said load driving means, to said timing means, to said detecting means, and to said light sensing means, for asserting said power control signals in response to said light sensing means and said timing means.

5. The apparatus of claim 4 wherein said brightness control means comprises:

(a) a light level comparator, coupled to said light sensing means, for comparing light measured by said light sensing means to a predetermined light level and generating a comparison signal indicative of said comparison; and (b) a power control circuit, coupled to said light level comparator, to said load driving means, to said detecting means, and to said timing means, for generating a first of said power control signals in response to said comparison signal, said first time-out signal, and said detecting means.

6. The apparatus of claim 5 wherein said load driving means drives power to a first light in response to said first power control signal.

7. The apparatus of claim 6 wherein said power control circuit generates said first power control signal when said detecting means detects the area is occupied and said comparison signal indicates said sensed light level is above said predetermined light level and wherein said power control circuit maintains said first power control signal until said timing means generates said first time-out signal.

8. The apparatus of claim 7 further comprising adjusting means for adjusting said predetermined amount of time.

9. The apparatus of claim 7 wherein said timing means generates a second time-out signal when said area is unoccupied for a second time period less than said first time period, and wherein said brightness control means further comprises:

(c) a second power control circuit, coupled to said timing means, to said detecting means, and to said load driving means, for generating a second one of said power control signals in response to said second time-out signal and said detecting means.

10. The apparatus of claim 9 wherein said load driving means drives power to a second light in response to said second power control signal.

11. The apparatus of claim 10 wherein said second power control circuit generates said second power control signal when said detecting means detects the area is occupied and wherein said second power control circuit maintains said second power control signal until said timing means generates said second time-out signal.

12. The apparatus of claim 11 further comprising time adjusting means for adjusting said first time period and said second time period.

13. An apparatus for controlling a light source, said apparatus comprising:

(a) detecting means for detecting whether an area is occupied;

(b) light sensing means for measuring a level of ambient light;

(c) timing means, coupled to said detecting means, for generating a first time-out signal when the area is unoccupied for a first time period; and (d) light control means, coupled to said detecting means and to said light sensing means, for controlling said light source in response to said detecting means, said first time-out signal, and said light sensing means;

wherein said light source comprises at least a single light and said light control means comprises:

switching means, coupled to said light, for switching said light OFF in response to said first time-out signal; and brightness adjusting means, coupled to said light sensing means, for adjusting the brightness level of said light in response to said light sensing means.

14. An apparatus for controlling a light source, said apparatus comprising:

(a) detecting means for detecting whether an area is occupied;

(b) light sensing means for measuring a level of ambient light;

(c) timing means, coupled to said detecting means, for generating a first time-out signal when the area is unoccupied for a first time period; and (d) light control means, coupled to said detecting means and to said light sensing means, for controlling said light source in response to said detecting means, said first time-out signal, and said light sensing means;

wherein said light source comprises at least a single light and said light control means comprises:

switching means, coupled to said light, for switching said light OFF in response to said first time-out signal; and brightness adjusting means, coupled to said light sensing means, for adjusting the brightness level of said light in response to said light sensing means and said timing means, said brightness adjusting means comprising:

i) comparing means, coupled to said light sensing means, for comparing the sensed level of ambient light with a predetermined light level; and ii) a brightness control circuit, coupled to said timing means and to said comparing means, for adjusting the brightness of said light.

15. The apparatus of claim 14 wherein said brightness control circuit increases the brightness of said light when said comparing means detects the sensed level of light is below said predetermined light level, and decreases the brightness of said light when said comparing means detects the sensed level of light is above said predetermined level.

16. The apparatus of claim 14 wherein said timing means generates a second time-out signal when said area is unoccupied for a second time period shorter than said first time period and wherein said brightness control circuit increases the brightness of said light when said comparing means detects the sensed level of light is below said predetermined light level, and decreases the brightness of said light when said comparing means detects the sensed level of light is above said predetermined level and said timing means generates said second time-out signal.

17. The apparatus of claim 15 or 16 wherein said light is coupled to a dimmable ballast and wherein said brightness adjusting means further comprises an analog voltage output circuit, coupled to said dimmable ballast, for outputting an analog voltage level to control the brightness of said light.

18. The apparatus of claim 15 or 16 further comprising an adjusting means for adjusting said predetermined level of light.

19. The apparatus of claim 15 or 16 further comprising an adjusting means for adjusting said first and second time periods.

20. An apparatus for controlling at least a first and second light, said apparatus comprising:
  (a) detecting means for detecting whether an area in which said first and second lights are situated is occupied;
  (b) light sensing means for measuring a level of ambient light in said area;
  (c) timing means, coupled to said detecting means, for timing periods when said area is unoccupied;
  (d) a comparator circuit, coupled to said light sensing means, for comparing the measured light level to a predetermined light level; and
  (e) a control circuit, coupled to said comparator circuit, to said detecting means, to said timing means, and to said first and second lights, for switching power to said first light in response to said detecting means, said timing means, and said comparator circuit and to said second light in response to said timing means, said detecting means, and said comparator circuit; wherein:
    said timing means generates a first time-out signal when said area is unoccupied for a first time period and generates a second time-out signal when said area is unoccupied for a second time period shorter than said first time period;
    said control circuit switches said second light OFF in response to said comparator circuit only when said second time-out signal is generated; and
    said control circuit switches said first and second lights OFF when said first time-out signal is generated.

21. An apparatus for controlling at least a first and second light, said apparatus comprising:
  (a) detecting means for detecting whether an area in which said first and second lights are situated is occupied;
  (b) light sensing means for measuring a level of ambient light in said area;
  (c) timing means, coupled to said detecting means, for timing periods when said area is unoccupied;
  (d) a comparator circuit, coupled to said light sensing means, for comparing the measured light level to a predetermined light level; and
  (e) a control circuit, coupled to said comparator circuit, to said detecting means, to said timing means, and to said first and second lights, for switching power to said first light in response to said detecting means, said timing means, and said comparator circuit and to said second light in response to said timing means, said detecting means, and said comparator circuit; wherein:
    said comparator circuit comprises a first and second comparator, said first comparator comparing the measured light level to a first predetermined light level and said second comparator comparing the measured light level to a second predetermined light level; and
    said control circuit switches power to a third light in response to said timing means, said detecting means, and said second comparator circuit.

22. An apparatus for controlling a light in an area, said apparatus comprising:
  (a) detecting means for detecting whether the area is occupied;
  (b) light sensing means for measuring a level of ambient light;
  (c) timing means, coupled to said detecting means, for timing periods when the area is unoccupied;
  (d) comparing means, coupled to said light sensing means, for comparing said measured light level to a predetermined light level;
  (e) brightness adjusting means, coupled to said timing means and to said comparing means, for adjusting the brightness of said light in response to said timing means and said comparing means; and
  (f) switching means, coupled to said detecting means and to said light sensing means, for switching power to said light in response to said detecting means and said timing means; wherein:
    said timing means generates a first time-out signal when the area is unoccupied for a first time period and generates a second time-out signal when the area is unoccupied for a second time period shorter than said first time period;
    said brightness adjusting means increases the brightness of said light when said measured ambient light level decreases by a predetermined amount;
    said brightness adjusting means decreases the brightness of said light when said measured ambient light level increases by a predetermined amount and said second time-out signal has been generated; and
    said switching means switches said light OFF when said first time-out signal is generated.

23. An apparatus for controlling a light in an area, said apparatus comprising:
  (a) detecting means for detecting whether the area is occupied;
  (b) light sensing means for measuring a level of ambient light;
  (c) timing means, coupled to said detecting means, for timing periods when the area is unoccupied;
  (d) comparing means, coupled to said light sensing means, for comparing said measured light level to a predetermined light level;
  (e) brightness adjusting means, coupled to said timing means and to said comparing means, for adjusting the brightness of said light in response to said timing means and said comparing means; and
  (f) switching means, coupled to said detecting means and to said light sensing means, for switching power to said light in response to said detecting means and said timing means;
    wherein said light is coupled to a dimmable ballast and wherein said brightness adjusting means comprises an analog voltage output circuit, coupled to said dimmable ballast, for outputting a voltage level to control the brightness of said light.

24. The apparatus of claim 23 wherein said analog voltage output circuit outputs a voltage in the range of 2 and 10 volts.

25. The apparatus of claim 23 wherein said analog voltage output circuit outputs a voltage in the range of 1 and 12 volts.

* * * * *